Oct. 17, 1950     T. J. R. DIBDIN     2,526,461
APPARATUS FOR GELLING AND VULCANIZING RUBBER
Filed Feb. 14, 1948     9 Sheets-Sheet 2
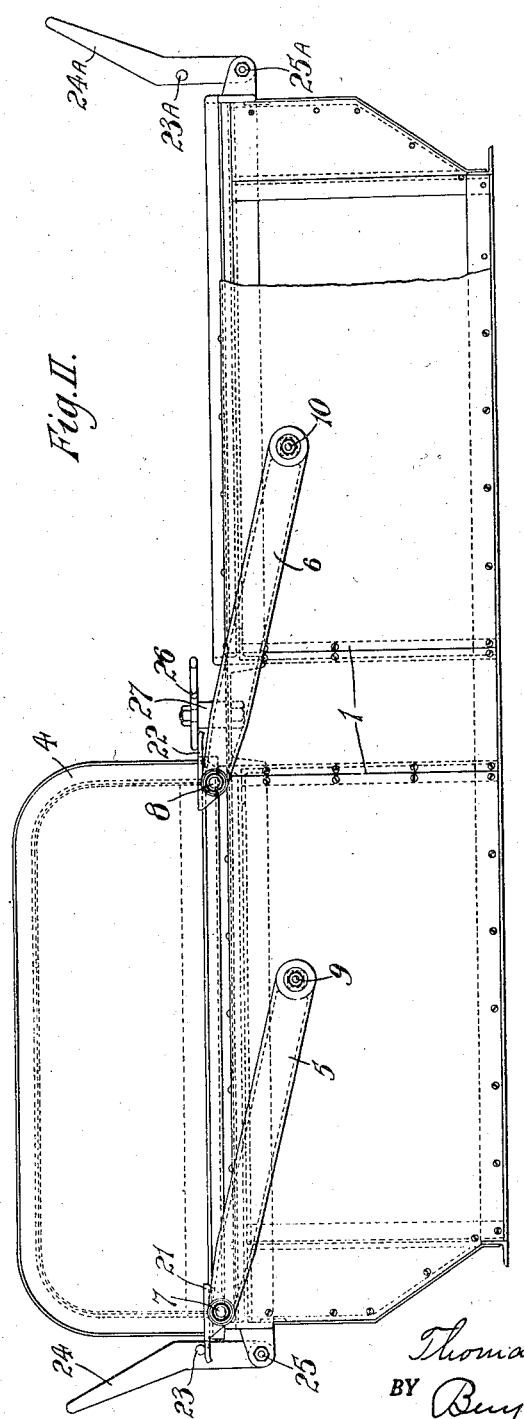
INVENTOR,
Thomas J. R. Dibdin
BY Benj. T. Rauber
his attorney

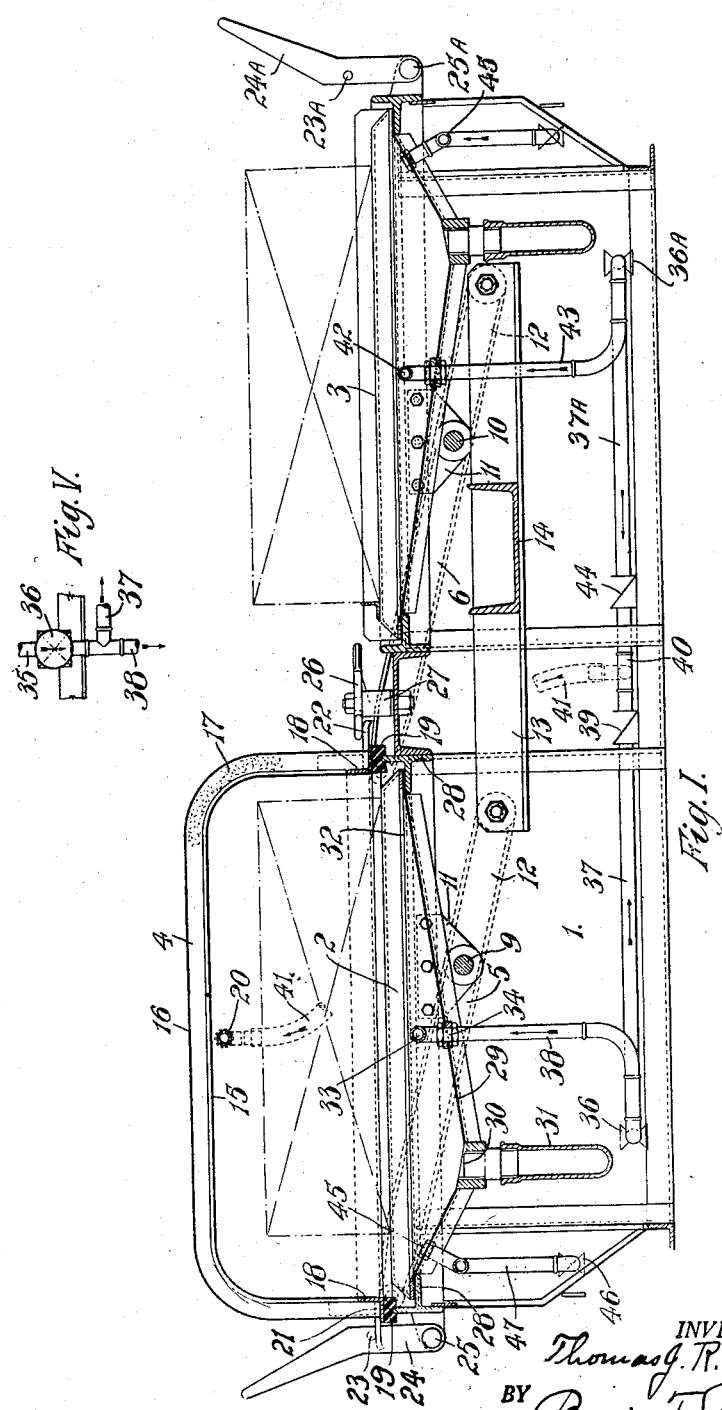

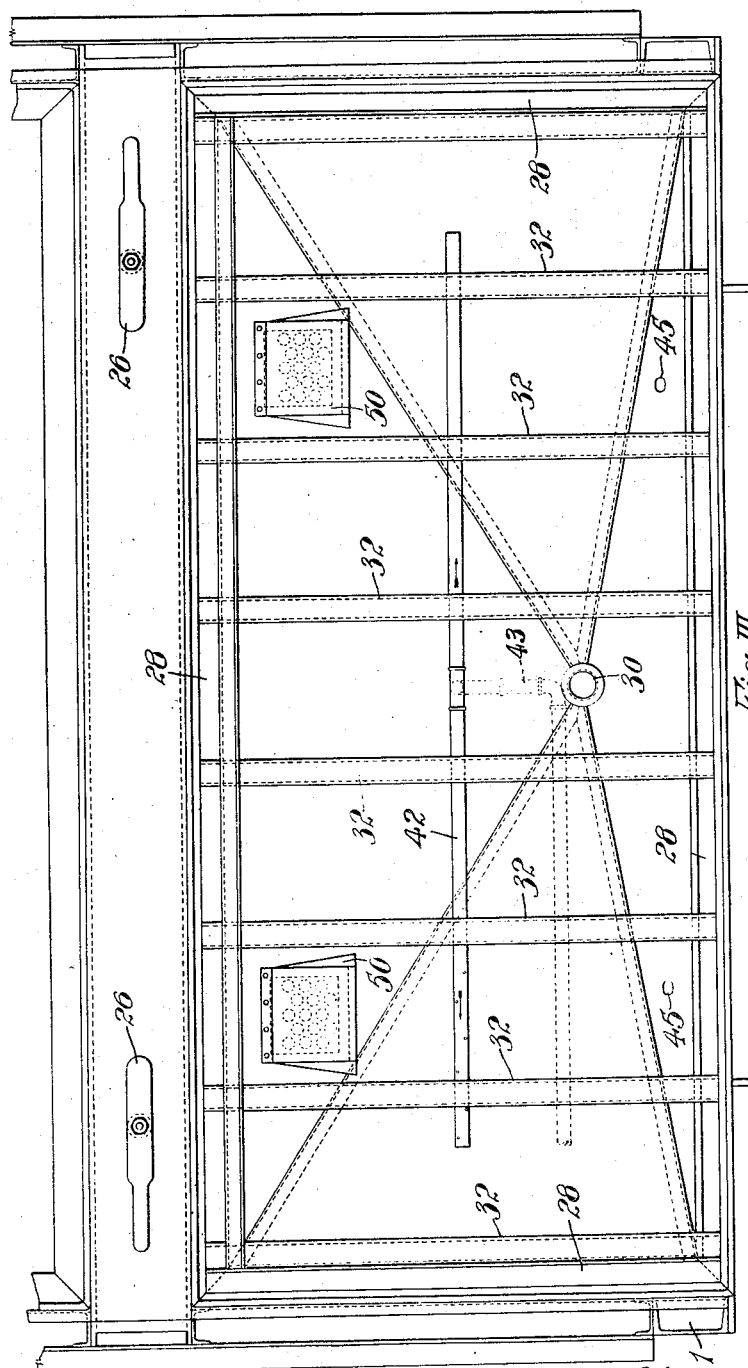

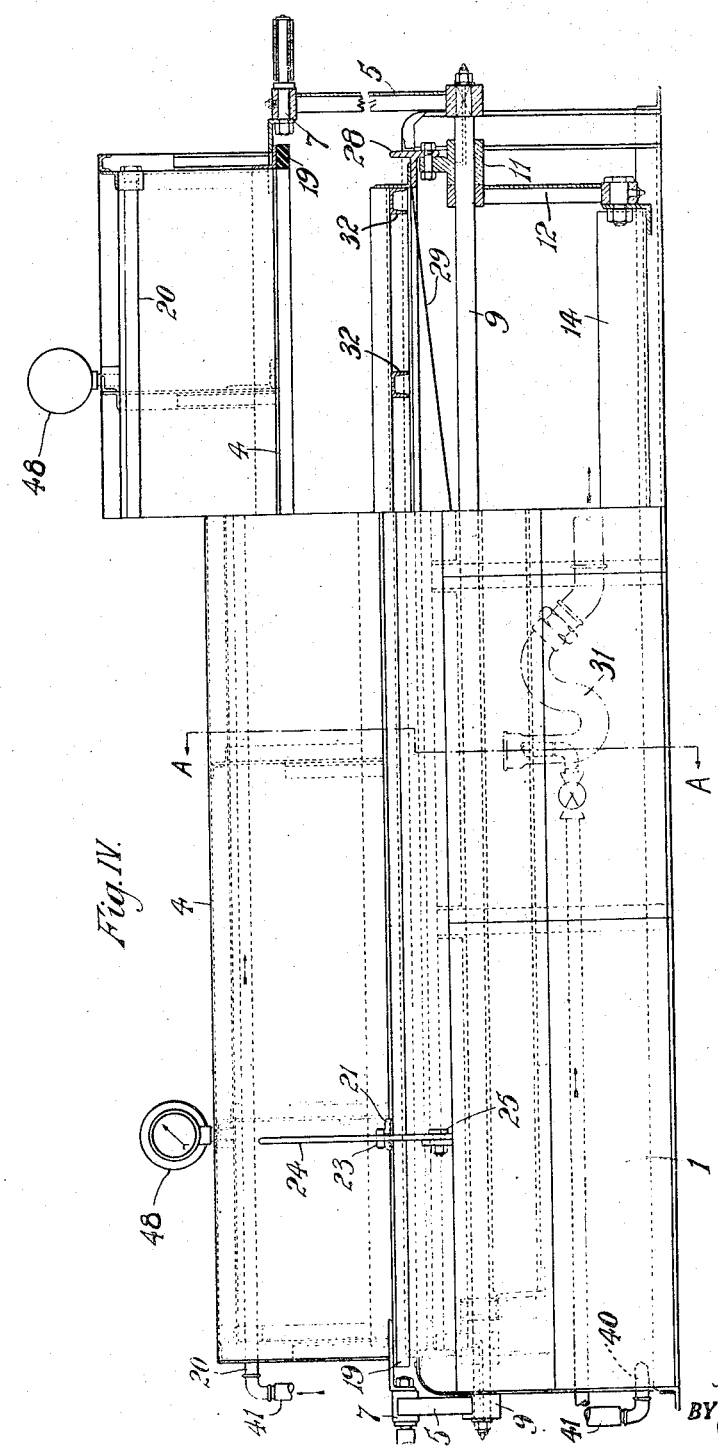

Oct. 17, 1950 T. J. R. DIBDIN 2,526,461
APPARATUS FOR GELLING AND VULCANIZING RUBBER
Filed Feb. 14, 1948 9 Sheets-Sheet 5
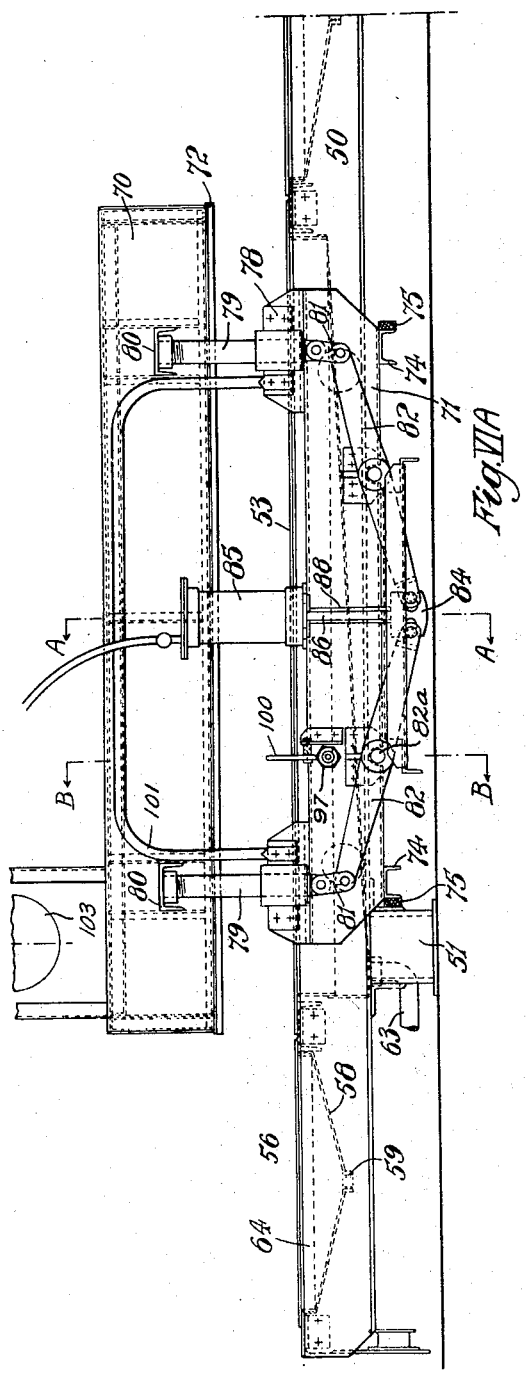
INVENTOR.
Thomas J. R. Dibdin
BY Benj. T. Rauber
his attorney

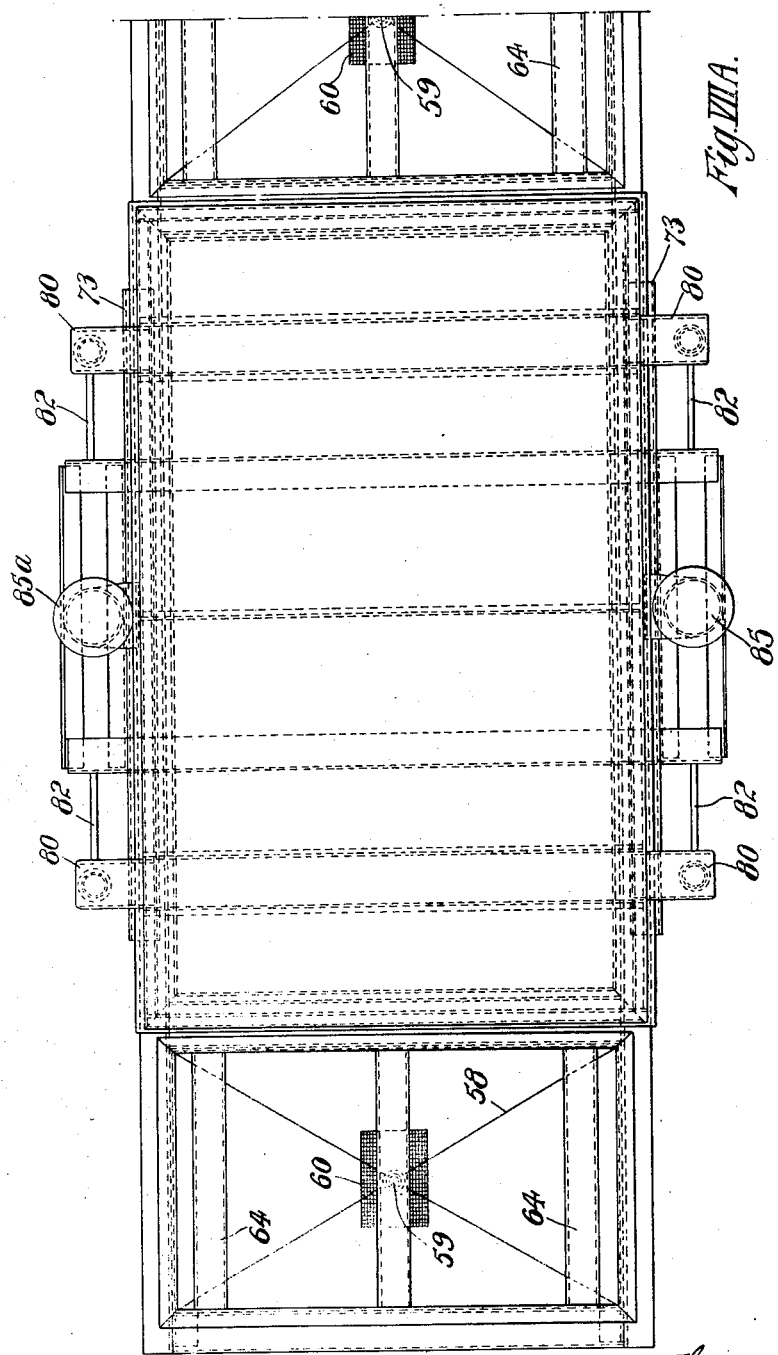

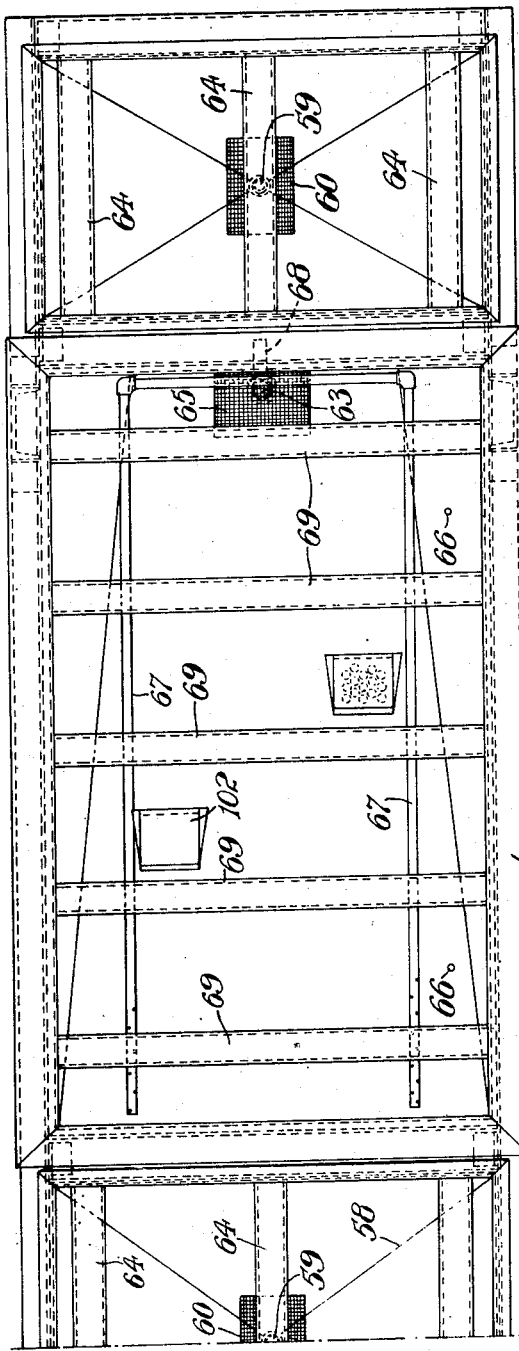

Oct. 17, 1950 T. J. R. DIBDIN 2,526,461
APPARATUS FOR GELLING AND VULCANIZING RUBBER
Filed Feb. 14, 1948 9 Sheets-Sheet 8
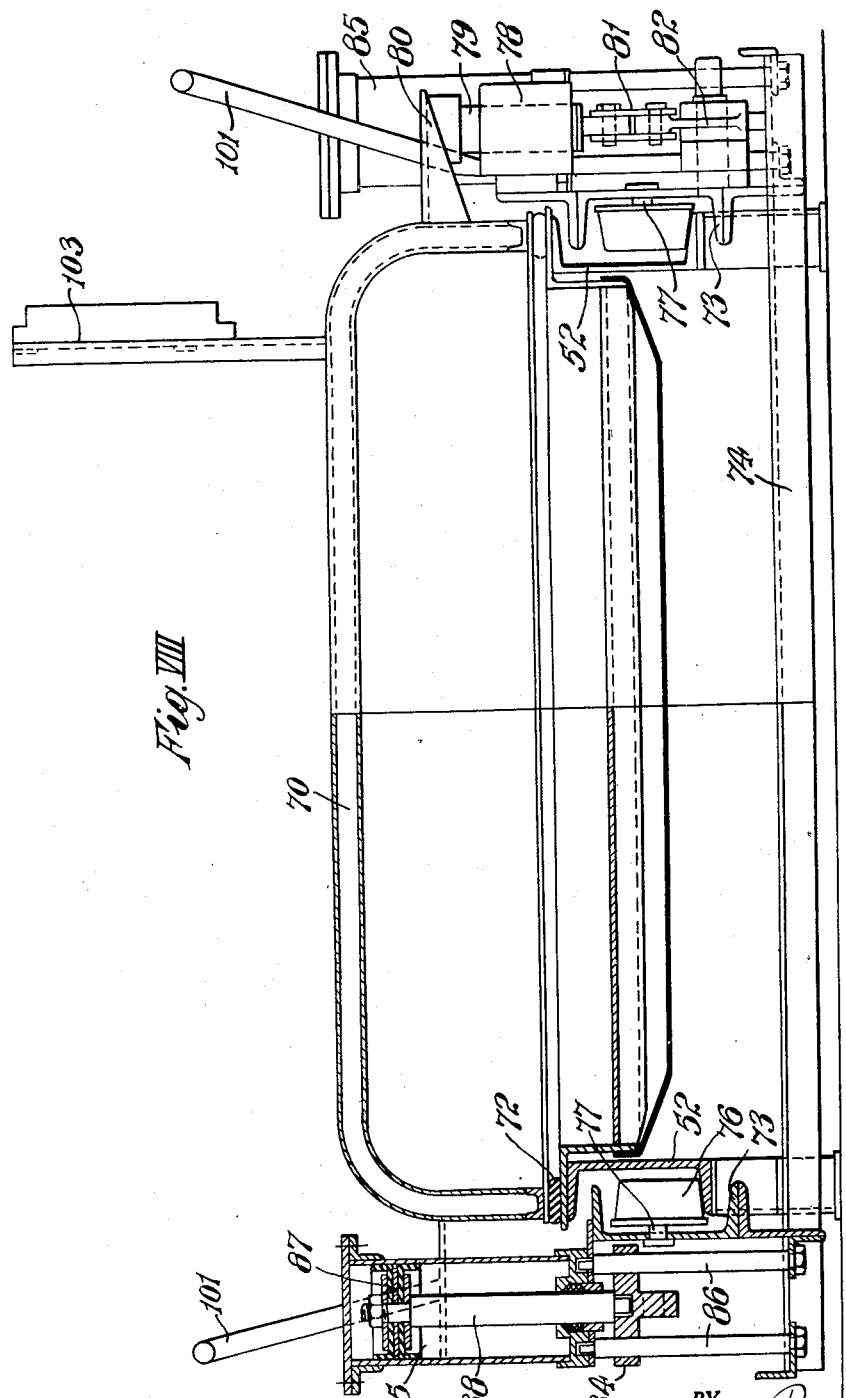
INVENTOR.
Thomas J. R. Dibdin
BY Benj. T. Rauber
his attorney

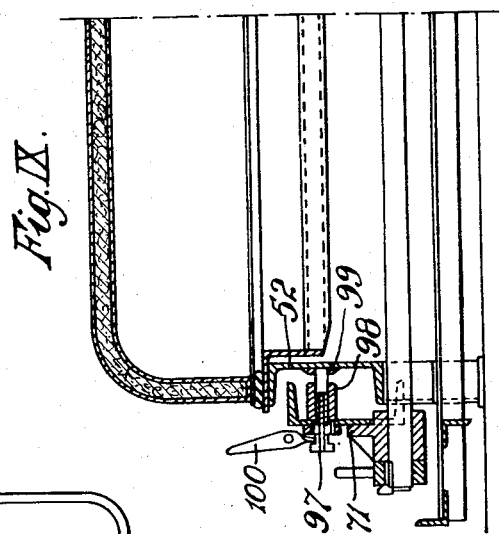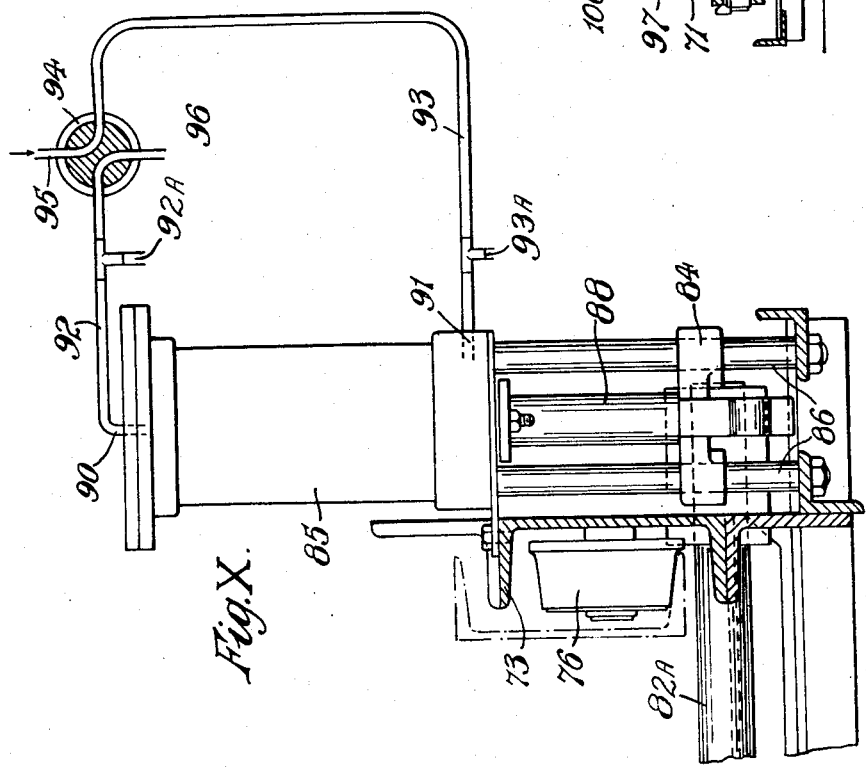

Patented Oct. 17, 1950

2,526,461

UNITED STATES PATENT OFFICE 2,526,461

APPARATUS FOR GELLING AND VULCANIZING RUBBER

Thomas James Rimbault Dibdin, Liverpool, England, assignor to Dunlop Tire and Rubber Corporation, Buffalo, N. Y., a corporation of New York Application February 14, 1948, Serial No. 8,373
In Great Britain February 11, 1947

Section 1, Public Law 690, August 8, 1946
Patent expires February 11, 1967

6 Claims. (Cl. 18—6)

My invention relates to improvements in apparatus for gelling and vulcanizing rubber articles, particularly foamed compounded aqueous dispersions of rubber.

It is known to make sponge rubber articles by passing moulds containing a compounded aqueous dispersion of vulcanizable rubber in a foamed gelled condition through a tank of hot water, or by placing the moulds in an atmosphere of steam within an autoclave, whereby vulcanization of the foamed dispersion is effected. It has been found, however, that the movement of the moulds containing gelled but unvulcanized foamed dispersion necessitated by these prior methods tends to produce objectionable ripple surfaces on the final product.

My present invention provides apparatus for gelling and vulcanizing rubber in the form of an aqueous dispersion whereby movement of the moulds containing the dispersion prior to and during the gelling and vulcanization operation is obviated.

In my invention, apparatus for gelling and vulcanizing rubber articles comprises a base for supporting rubber articles at two stations in side by side relationship, a movable cover-member adapted to form with the base at each station a chamber for enclosing an article at said station, means for transporting the said cover member from the one station to the other, and means to admit steam within the cover member at each of said stations.

Advantageously the said base is provided with means for preventing the development of a pressure greater than atmospheric within the chamber.

The various features of the invention are illustrated by way of example in the accompanying drawings in which:

Fig. I represents a sectional elevation of an apparatus embodying the invention taken on the line A—A of Figure IV.

Fig. II is an end elevation of the apparatus shown in Figure I.

Fig. III is a plan view of the half of the apparatus of Figure I which is uncovered.

Fig. IV is a side view of the apparatus partly in elevation with the cover in a lowered position, and partly in section with the cover in a raised position.

Fig. V is a detail illustrating the arrangement of pipe work for supplying water to the spray pipes of the apparatus of Fig. I.

Fig. VIA is a side elevation of the left part of apparatus embodying another form of the invention and Fig. VIB is a vertical section on the center line of the right part of the apparatus.

Figs. VIIA and VIIB are plan views of the left and right parts of the apparatus shown in Fig. VI.

Fig. VIII is an end view of the apparatus shown in Fig. VI, the left half being in section on the line A—A of Fig. VIA and Fig. IX is a half vertical section on the line B—B of Figure VIA.

Fig. X is a detail view illustrating a hydraulic cylinder and valve connections of the apparatus of Figs. VIA–IX.

Referring first to Figures I to V, the apparatus comprises essentially a base 1 formed of girder members and sheet metal and of suitable height for a workman to manipulate moulds thereon, the top of the base being formed with two stations 2 and 3 for moulds extending lengthwise of the top of the base in side by side relationship. A cover 4 is provided adapted to be placed over either of the stations 2 and 3; for this purpose the cover is joined at one end to parallel arms 5 and 6, the upper end of arm 5 being pivotally connected to the cover 4 at 7 adjacent one bottom corner of the end of the cover, and the other arm 6 being pivotally connected at 8 to the other bottom corner of the same end of the cover. The other ends of the arms 5 and 6 are rigidly connected to shafts 9 and 10 respectively which are mounted in bearings 11 and extend lengthwise of the apparatus one beneath each of the stations 2 and 3; the other ends of shafts 9 and 10 are connected to arms which are in turn each pivotally connected to the cover in like manner to arms 5 and 6. Beneath the base 2 adjacent to each end of the shafts 9 and 10 are two parallel arms 12 rigidly connected thereto, Figs. I and IV, the lower ends of these arms being pivotally connected to a link 13. The links 13 at either end of the apparatus are connected by a trough member 14 in which weights can be placed to balance the cover 4. Cover 4 can thus be moved from one station to the other by rotation of the shafts 9 and 10 causing the parallel arms 5 and 6 to swing through an arc of a circle; the cover as a whole thus moves in a semi-circular path, being first raised from one station, moved over the base and brought down to the second station.

The cover itself is double walled, having an inner wall 15 and an outer wall 16 between which is packed aluminium foil 17 for heat insulating purposes, the walls 15 and 16 being spaced apart by four lengths of L-section girder 18 defining the rectangular mouth of the cover. Bonded to the girder is a sealing strip 19 of rubber or other resilient material extending around the entire perimeter of the mouth. A spray pipe 20 to which water can be supplied by means to be described subsequently extends lengthwise centrally of the cover adjacent to the top of the inner wall. Projecting laterally from each side of the cover adjacent to the mouth thereof are two pairs of slit lugs 21 and 22 (one of each pair being visible in Figs. I and II) and the bench is provided with two pairs of levers 24, 24a pivotally mounted at 25, 25a and having pins 23, 23a adapted to engage with the lugs. One pair of levers is mounted at each side of the bench, one lever of each pair being visible. Near the center of the bench two levers 26 are provided each rotatably mounted on vertical pins 27 projecting upward from the bench. With the cover in the position shown in Figure I pins 23 of levers 24 engage lugs 21 of the cover while levers 26 engage lugs 22, and thus maintain the seal between the cover and the bench. When the cover is in position over station 3 it is similarly maintained in sealing relationship with the bench by engagement of pins 23a of levers 24a with lugs 22, and engagement of levers 26 with lugs 21.

Each station 2 and 3 of the mould is similarly constructed but of opposite hand, and it will be sufficient to describe the one on the left hand side of Fig. I. The station is defined by a rectangular framework 28 of T-shaped girder members, one flange of the T-projecting upwards to contact the sealing strip 19 of the cover, while a second flange of each girder projects inward and together the flanges form a ledge extending the whole way round the station. On the ledge is supported a trough-shaped bottom 29 sloping downwardly to an outlet 30 for liquid, beneath which outlet is an S-pipe 31 disposed in known manner to form a trap to prevent the escape of steam. A number of bars 32 resting on girders 28 form supports for moulds placed thereon. If desired, these bars may in turn support a platform of perforated sheet metal on which moulds can be supported which are too small to be supported on adjacent bars 32. Extending lengthwise and centrally of the trough immediately beneath the bars 32 is a perforated pipe 33 through which cooling water can be sprayed on to moulds supported on the bars 32. This water can be delivered through pipe 35 controlled by valve 36 (see Figure V), on the outlet side of which is a branched pipe; one branch 38 passes through the bottom of trough 29 at 34 and delivers water to the spray pipe 33 while the second branch 37 communicates through a non-return valve 39 with one arm of a T-piece 40, a second arm of which T-piece is connected by a flexible pipe 41 to the spray pipe 20 in the cover. A similar spray pipe 42 is disposed at the station 3 to which water can be supplied by pipe 43 controlled by a further valve (not shown) similar to valve 36 of Figure V and from which pipe 43 a further pipe 37a branches and communicates through a non-return valve 44 with the third arm of T-piece 40. It is thus possible to spray water on to moulds at the station 2 both from pipe 20 and spray pipe 33 by opening valve 36, the water passing along pipe 37 being prevented from passing into the pipe 43 by virtue of non-return valve 44. When the cover is in position over station 3 water can be sprayed over moulds at that station from the spray pipe 20 within the cover and the spray pipe 42 by supplying water from the second valve (not shown) similar to valve 36; water then passing to the spray pipe 20 through pipes 37a and 41 but not into the pipe 37 because of the non-return valve 39.

At the side of the trough 29 adjacent to one edge of the apparatus are two steam inlets 45 to which steam can be supplied through valve 46 and pipework 47. The cover is also provided with a thermometer 48. In the floor of each trough 29 is a flap valve or valves 50 adapted to open inwardly.

The use of the above apparatus will now be described with reference to vulcanizing in closed moulds a foamed rubber latex compounded to gel in the cold. It will be assumed that the cover is not in the position shown in the diagram but in its other position over station 3, and that a number of moulds can be put on each station simultaneously. Moulds filled with the foamed ungelled dispersion are put on the bench at station 2 and are allowed to stand until gelling has taken place. By manual operation the cover 4 is swung from the station 3 to cover the moulds at station 2, the sealing strip 19 being brought to rest on the T-piece 28; the cover 4 is clamped down in this position by means of the levers 24, 26. The trough 29 co-operating with the cover thus forms an enclosed space around the moulds to which steam can be supplied as desired to carry out the vulcanization operation. For this purpose valve 46 is opened to permit steam to be delivered through inlets 45; some air will then be displaced through the S-pipe 31 and condensation will occur on the inside of cover 4 and trough 9 and the outside of the mould. This condensate will in part escape through pipe 31, and the remainder will collect in the bend thereof and form a seal. As the temperature within the apparatus approaches 100° C., as shown by the thermometer 48, the supply of steam is cut down so that this temperature is maintained without condensate in the S-pipe 31 being blown out, and this condition is maintained until vulcanization is complete. The supply of steam is then cut off and valve 36 is opened to deliver water to the spray pipe 20 through pipes 37 and 41 and to spray pipe 33 through pipe 38. The water delivered on to the moulds in this manner will cool then and then escape through pipe 31, and the water is then cut off at valve 36. Reduction in pressure within the apparatus caused by condensation of steam during this operation will be prevented by relief valves 50. While vulcanization is proceeding in this way at station 2, further moulds are placed on the apparatus at station 3, filled with foamed dispersion, and left to gel as above so that they will be ready for vulcanization when the treatment of the foam in the moulds within the cover has been completed. This vulcanization having been carried out, the cover 4 is moved to its alternative position over station 3 thus uncovering the moulds containing the now vulcanized foam at station 2 and covering the moulds at station 3 containing the foam awaiting vulcanization. Vulcanization is then carried out as has been described above, the moulds being finally cooled from the water supply from spray pipe 20 and spray pipe 42, the water for pipe 20 now being delivered through pipe 43 and 41. While this is proceeding the moulds containing the vulcanized product at station 2 are removed, further moulds put in their place and filled with foam in like manner.

The apparatus as shown with reference to Figs. VIA to X is constructed of sheet metal and girders and comprises a base 50 supported on legs 51, the sides of the base being channel-shaped members 52. The base is divided by transverse members into two vulcanizing stations 53 and 54 separated by a draining station 55, and draining stations 56 and 57 similar to draining station 55 one at each end beyond the vulcanizing stations. Each draining station is of the same construction and consists essentially of bars 64 over a sloping trough 58 beneath the top of the bench 50, with a drain 59 at the lowest point of each trough covered by gauze 60. Articles on bars 64 can be sprayed with water from a hose pipe (not shown). The two vulcanizing stations 53 and 54 are similar in construction and it will be sufficient to describe one of them. Each has a flat perimeter 61 and a bottom formed of a trough 62 sloping down to an outlet 63, protected by gauze 65, in communication with a trap for condensate (not shown) similar to that described with reference to Figs. I to V. Adjacent to one edge of the trough are two inlets 66 through which steam can be supplied through a valved pipe (not shown). Two water spray pipes 67 extend lengthways of the apparatus within the trough 62 by which cold water can be supplied as desired through inlet pipe 68. Slightly below the flat perimeter 61 of each station are transverse supporting bars 69 on which moulds can be supported. The trough 62 has two flap valves 102 hinged at their highest edge and adapted to open inwards.

The apparatus is also provided with a cover 70 which is movable lengthways of the apparatus on a carriage 71. The cover is double walled and of sufficient depth to enclose moulds placed on the apparatus at either vulcanizing station, and has a mouth of size and shape such that it fits the flat perimeter 61 of either vulcanizing station; a sealing strip 72 ensures that a sound seal is obtained between the cover and the perimeter. The carriage 71 is formed of two side members 73 disposed parallel to the side members 52 of the base and joined by transverse channel shaped members 74 extending underneath the base 50; these transverse members 74 are provided with buffers 75 of rubber or other resilient material which contact the respective legs 51 of the apparatus when the carriage is at either end of its travel. The carriage is mounted on wheels 76 each rotatably mounted on a stub-axle 77 and resting on the lower flanges of channel members 52, which flanges thus form tracks for the wheels.

On each side of the carriage are vertical sleeves 78 one adjacent to each end, in which pillars 79 support the cover 70 by means of lugs 80 projecting laterally from the cover. The lower ends of the two pillars on the same side of the carriage are each connected through a floating link 81 to one end of an arm 82 pivoted near its center on shafts 82a passing through each side member 73 of the carriage, the other ends of the two arms on the same side of the carriage being joined by links 84. Links 84 are slidable along vertical rods 86 supported on the carriage 71 which rods in turn support hydraulic cylinders 85 and 85a. (See Fig. VIII and Fig. X.) As shown in Fig. X cylinder 85 has an inlet 90 at the top and an inlet 91 at the bottom, the two being connected by pipes 92 and 93 to a 4-way valve 94 which is also in communication with inlet 95 for hydraulic fluid and an outlet 96 for such fluid. Branch pipes 92a and 93a join pipes 92 and 93 to inlets (not shown) at, respectively, the top and bottom of cylinder 85a.

To fix the carriage in position over one or the other vulcanizing station the carriage is fitted with a spring-loaded pin 97 (see Fig. IX) movable in sleeve 98 mounted on the carriage 71 the pin normally protruding from sleeve 98 and engaging with a recess in one of stops 99 (one is shown) fixed to girder 52 at positions corresponding to each of the two positions of the cover on the apparatus. Movement of the pin to engage or disengage it from the top is effected by means of lever 100. Towing handles 101 enable the carriage to be gripped to move it from one position to the other. The temperature within the cover can be observed by recording thermometer 103

The use of the above apparatus will now be described as applied to the production of sponge rubber mattresses from a foamed compounded latex compounded to gel in the cold. One mould is situated at each vulcanizing station and can be closed by a lid in two sections each having inwardly projecting plugs, so that the mattress is moulded with recesses on the one side. It will be assumed that the carriage and cover are on the right hand side of the apparatus with the cover in a raised position. The moulds rest on the top of bars 64 to lie wholly within the respective flat perimeter 61 of each station. The mould at station 53 is then filled with foamed latex and the carriage and cover are then moved by means of towing handles 101 until the cover is directly over the vulcanizing station 53 and the lever 100 is then operated to lock the carriage in position. The latex is allowed to gel, and valve 94 is turned to put pipe 93 into communication with outlet 96 and pipe 92 into communication with inlet 95, thus supplying hydraulic liquid to cylinder 85 above piston 87 and allowing liquid to escape from beneath it whereby the cover is lowered until the sealing strip 71 is pressed against the perimeter 61; the mould is thus in a closed vulcanizing chamber formed by the cover 70 and trough 62. The latex is then allowed to gel, and steam is then admitted through inlets 66, air being displaced through the trap attached to outlet 63; condensate will form and seal the trough against escape of steam. As the temperature within the vulcanizing chamber reaches 100° C. as indicated by thermometer 103 the supply of steam is cut down so that the temperature is maintained at substantially 100° C. but no escape of steam through the trap occurs.

When vulcanization is complete at station 53 the supply of steam is cut off and cold water is admitted through the inlet 68 and is thus sprayed upon the mould and then drains away through the outlet 63. This will cause condensation of steam left in the chamber and the sub-atmospheric pressure thus created will be relieved through the opening of the relief valves 102. While the moulds are cooling the empty mould at vulcanizing station 54 is filled with foamed latex, and afterwards the supply of cold water is cut off and by operating valve 94 the cover is raised, lever 100 is operated to release the carriage and the carriage is moved to vulcanizing station 54 and again locked into position by lever 100. The cover is lowered by manipulating valve 94, and vulcanization of the dispersion in the mould at the vulcanizing station 54 is carried out as above. Meanwhile the lids of the mould containing vulcanized foam in the chamber 53 are removed, one section of the lid being placed in the draining space 56 at one end of the vulcanizing station and the other in the central draining space. The vulcanized mattress is removed from the mould, and mould and lid cleaned by water from a hose pipe, the lids in their respective draining spaces and the mould while still on bars 69 over the trough 62 of the vulcanizing station. The cleaned mould is then filled with foamed latex and the lids put in place. By this time vulcanization of the dispersion in the moulds in chamber 54 will have been completed and the cover is raised, brought back over chamber 53 and so on.

Having described my invention, I claim:

1. Apparatus for gelling and vulcanizing rubber articles comprising a base for supporting rubber articles at two stations in side by side relationship, a movable cover member, to form with the base at each said station a chamber for enclosing an article at said station, means for transferring the said cover member from one station to the other, and means to admit steam within the cover at each of said stations.

2. Apparatus of claim 1 comprising at each station a trough having a periphery adapted to mate with the mouth of said cover, means for supporting an article over said trough, and means for draining condensate collecting in said trough.

3. An apparatus according to claim 1 having means for preventing the development of a pressure substantially less than atmospheric pressure within said chamber.

4. An apparatus according to claim 1 wherein means for transferring the cover member comprises four parallel arms pivotally attached to each corner of the cover and to the frame of the apparatus.

5. An apparatus according to claim 1 in which the means for transferring the cover comprises a track disposed at each side of the base, a carriage movable along said track, vertically movable supports for said cover mounted on said carriage and hydraulic means mounted on said carriage for raising and lowering said supports and cover.

6. Apparatus of claim 1 having water spraying pipes in said cover member and in said base at each said station and a supply system having a branch to said cover and a branch to each of said stations, a check valve between said branch to said cover and each said branch to said stations, and means for admitting water selectively to each of said branch pipes to said stations.

THOMAS JAMES RIMBAULT DIBDIN.

REFERENCES CITED

The following references are of record in the file of this patent:

UNITED STATES PATENTS

| Number | Name | Date |
|---|---|---|
| 201,943 | Poland | Apr. 2, 1878 |
| 665,258 | Nielsen et al. | Jan. 1, 1901 |
| 2,198,493 | Freeman | Apr. 23, 1940 |
| 2,259,430 | Soderquist | Oct. 14, 1941 |
| 2,308,971 | Carter | Jan. 19, 1943 |
| 2,354,433 | Carter | July 25, 1944 |